April 13, 1926.

J. FRICK 1,581,050

COIN CONTROLLED DISPENSING APPARATUS

Filed July 23, 1919      4 Sheets-Sheet 1

WITNESS:

INVENTOR

John Frick
BY
ATTORNEY.

April 13, 1926.   1,581,050
J. FRICK
COIN CONTROLLED DISPENSING APPARATUS
Filed July 23, 1919    4 Sheets-Sheet 2
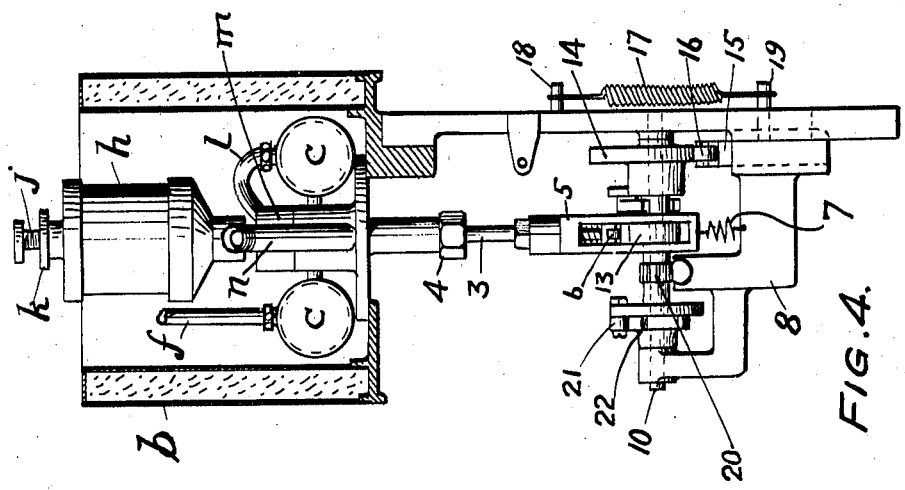
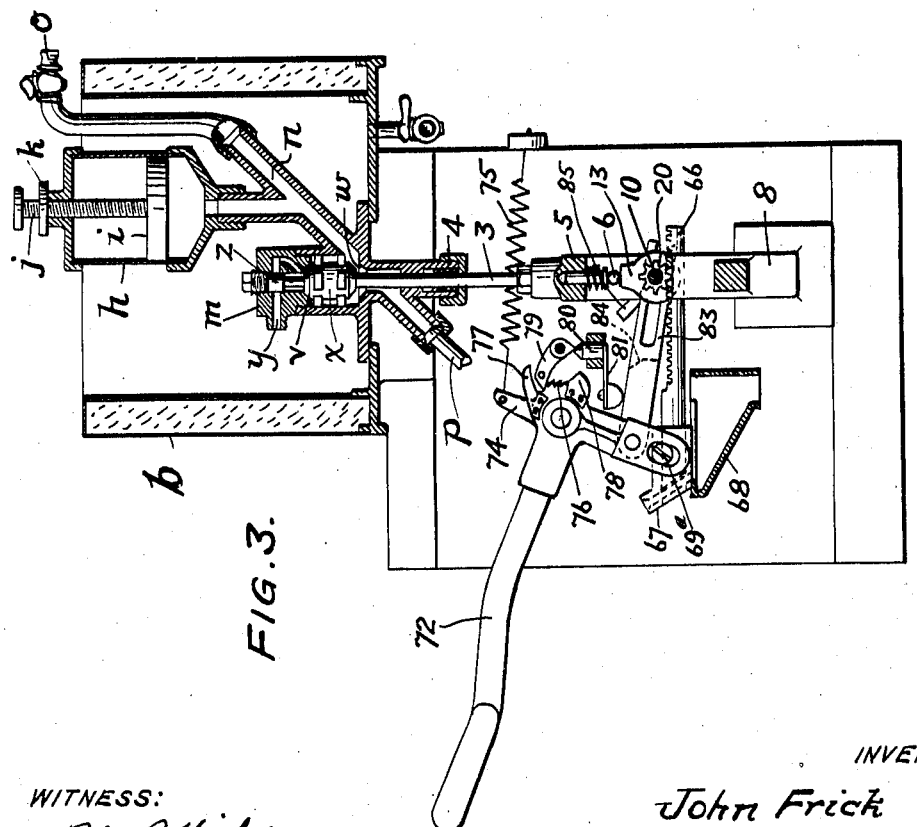
INVENTOR
John Frick
BY
ATTORNEY.
WITNESS:

April 13, 1926.
J. FRICK
1,581,050
COIN CONTROLLED DISPENSING APPARATUS
Filed July 23, 1919   4 Sheets-Sheet 3
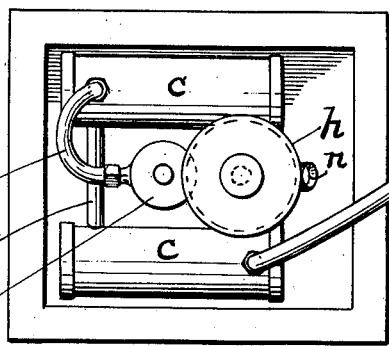
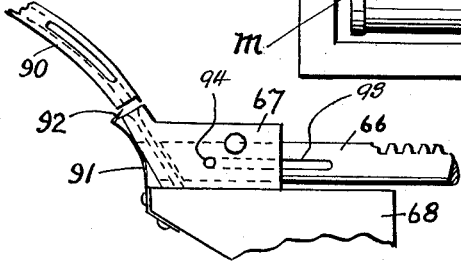
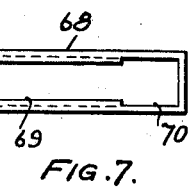
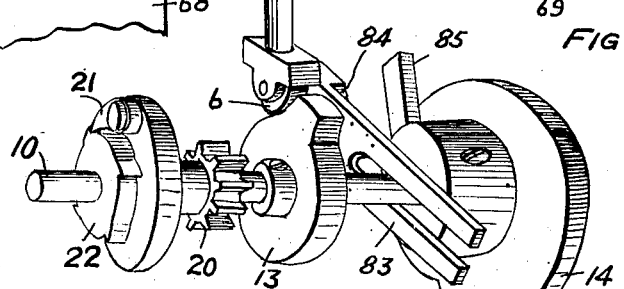
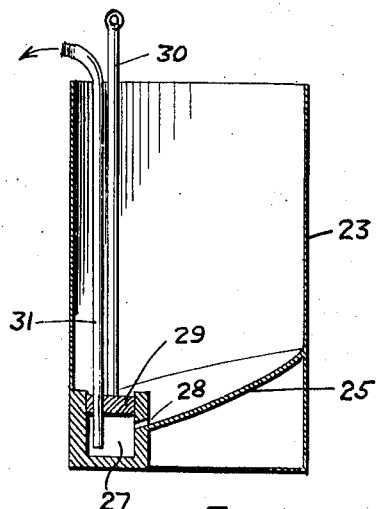
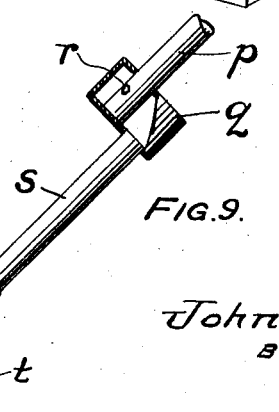
WITNESS:
INVENTOR
John Frick
BY Frank L. Busser
ATTORNEY.

April 13, 1926.                                           1,581,050
J. FRICK
COIN CONTROLLED DISPENSING APPARATUS
Filed July 23, 1919          4 Sheets-Sheet 4

WITNESS:
Robt. R. Kitchel.

INVENTOR
John Frick
BY
Frank S. Busser
ATTORNEY.

Patented Apr. 13, 1926.

1,581,050

UNITED STATES PATENT OFFICE.

JOHN FRICK, OF PHILADELPHIA, PENNSYLVANIA, ASSIGNOR, BY MESNE ASSIGNMENTS, TO RICHMOND BEVERAGE MACHINE CORPORATION, OF RICHMOND, VIRGINIA, A CORPORATION OF VIRGINIA.

COIN-CONTROLLED DISPENSING APPARATUS.

Application filed July 23, 1919. Serial No. 312,806.

*To all whom it may concern:*

Be it known that I, JOHN FRICK, a citizen of the United States, residing at Philadelphia, county of Philadelphia, and State of Pennsylvania, have invented a new and useful Improvement in Coin-Controlled Dispensing Apparatus, of which the following is a full, clear, and exact description, reference being had to the accompanying drawings, which form a part of this specification.

The object of my invention is to provide a liquid-dispensing apparatus, adapted, upon introduction of a relatively small sized coin or token and movement of a lever, to deliver a cup, or, upon introduction of a coin or token of relatively larger size and successive movement of two independent levers, to deliver a cup and supply thereto a measured quantity of mingled carbonated water and syrup.

A further object of my invention is to provide a vending machine which will be simple in operation and at the same time easily replenished with syrup and carbonated water and the parts of which may be readily and thoroughly cleaned.

A further object of my invention is to provide a machine which will be fool-proof and to render it impossible to cause the machine to deliver more than the predetermined quantities of syrup and charged water in any one delivering.

Referring to the accompanying drawings, in which I have illustrated a preferred embodiment of my invention and in which like symbols designated similar parts in the different views,—

Fig. 3 is a side elevation, partly in section, of the carbonated water cooling, measuring and delivering device and its operating mechanism.

Fig. 4 is a rear elevation, partly in section, of the carbonated water cooling, measuring and delivery device and its operating mechanism.

Fig. 5 is a plane view of the carbonated water cooling and measuring device.

Fig. 6 is a side elevation of the coin actuated mechanism.

Fig. 7 is a plan view of the base for the coin.

Fig. 8 is a perspective view of the carbonated water measuring and delivering actuating mechanism.

Fig. 9 is a side view, partly in section, of the carbonated water delivering line, showing means for preventing splashing of the water.

Fig. 10 is a sectional view showing the flavoring syrup reservoir and measuring and delivering pump.

Figure 1:
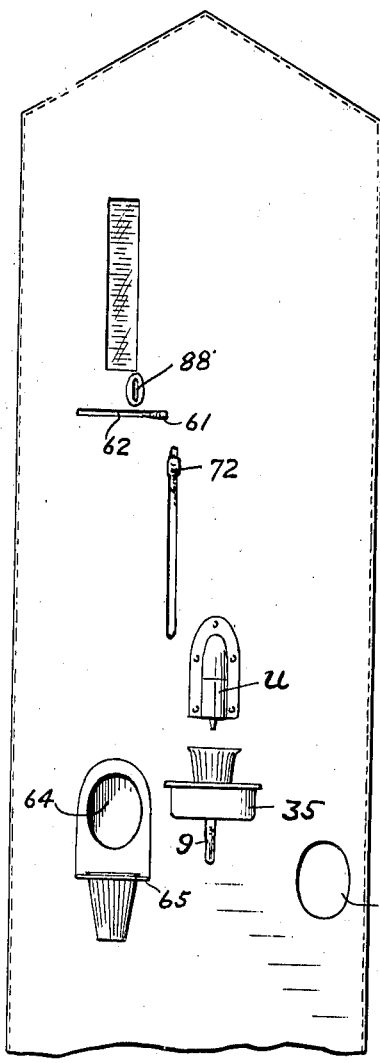
Fig. 1 is a front elevation of the machine casing showing operating and delivering devices.
Figure 2:
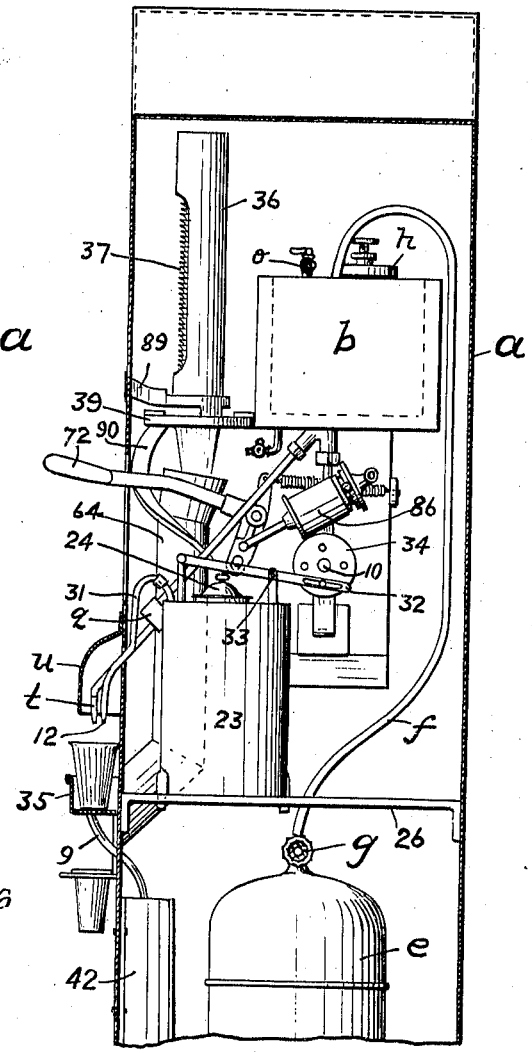
Fig. 2 is a side elevation of the complete machine with side casing removed.

The vending machine is composed of a carbonated water cooling, measuring and delivering element; a cup containing and coin connected manually operated delivering element and coin connected, manually operated, actuating mechanism for delivering a measured quantity of flavoring syrup and a measured quantity of carbonated water.

The elements are connected and mounted within a casing $a$, provided on its front with suitable holders for a cup and apertures for the insertion of a coin, the actuating lever, and delivering tubes.

The carbonated water cooling, measuring and delivering element comprises an insulated tank $b$, adapted to be iced, in which are suitably mounted the horizontal cylinders $c$ connected together by a pipe $d$ and connected to a supply of carbonated water $e$. Within the tank is located an upright cylinder $h$ enclosing a tight fitting plunger $i$ carried by a screw $j$ threaded in the cylinder head and retained in any desired position by means of a lock nut $k$.

A pipe $l$ connects one of the horizontal cylinders $c$ with a passage $y$ in the upper part of a valve casing *m*. A pipe *n* leading from the lower part of the valve casing has a Y branch leading to the bottom of cylinder *h*, the main line extending upward and out of the tank *b* and terminating in a valve *o*. A pipe *p* leads from the lower part of the valve casing and terminates in a muffler *q*. Small holes *r* in the side of the pipe allow communication from the pipe to the muffler. A pipe *s* leads from the muffler, out through the casing *a* and terminates at a nozzle *t*, which it partly incloses and beneath which is a cup holder 35. The end of the nozzle is protected by a shield *u* fastened to the casing. From the cup-holder a drain pipe 9 leads to a receptacle 42 within the casing. An aperture 46 in the casing *a* connects with the receptacle 42 and permits of the disposal of used cups.

The valve casing *m* is provided with two valve seats *v* and *w* and a double-faced valve *x*, above the top of which extends a pilot valve *z* adapted to control passage *y* and facilitates the seating of the main valve on seat *v*. It will be seen that when the valve is in its lower position its lower face will seat on seat *w*, closing communication between cylinder *h* and nozzle *t*, while its upper face and the pilot valve will be clear of seat *v* and passage *y* affording communication between cylinders *c*, the carbonated water supply *e*, and cylinder *h*, and vice versa. A plug is threaded onto the head of valve casing *m* and may be removed for cleaning the valve.

A valve stem 3, integral with valve *x*, extends out of the casing through a stuffing box 4 and is fitted on the end with a yoke 5. The yoke carries a spring-pressed tappet having a roller 6 on its end. Valve *x* is drawn into lower position by means of a spring 7 connected to bracket 8. Beneath the roller is a horizontal shaft 10 carried by bracket 8 in suitable bearings. Pinned to the shaft is a cam 13 adapted to act on the roller 6 and raise the valve against the action of spring 7, which, when the high point of the cam passes out of contact with the tappet, returns the valve to its lower position. A second cam 14 is pinned to the shaft and adapted to act on a block 15, provided with a roller 16 and slidable on the bracket 8, against the action of a spring 17, carried by a pin 18 in the frame and connected to a pin 19 extending from the block.

A pinion 20 is sleeved on the shaft 10, the sleeve being connected with the shaft, in one direction through the action of a pawl 21, carried by the sleeve, on ratchet 22 carried by the shaft.

The flavoring syrup containing, measuring and delivering element comprising a container 23, provided with a removable cover 24, and a false bottom 25, is suitably fastened to a frame 26.

A well 27, provided with a passage 28 flush with the false bottom, is positioned in the bottom of the container.

A plunger 29, having a stem 30, is fitted into the well, and a pipe 31 leads from near the bottom of the well through the plunger and through the casing *a*, terminating in a plain nozzle 12 adjacent to the carbonated water nozzle *t*, beneath shield *u*. A lever 32, pinned to a fulcrum 33, is connected at one end to the end of plunger stem 30 and at the other end, through a pin and slot, to a plate 34, suitably secured to the end of shaft 10.

The cup containing and delivering element comprises a cylindrical retainer 36, partially cut away in front to allow for filling with nested individual paper drinking cups 37, supported, within an annular flange 38, on the base 39 of the retaining and delivering device.

The nested cups are supported by one another, the flange 40 of the lower cup resting on the fingers 41.

The fingers 41 are adapted to slide in guideways and are maintained in their outer position, against the action of springs 43, extending between the fingers and the base 39, by means of the high points of circular cam plate 44.

Above fingers 41 are located similar fingers 45, adapted to slide in guideways and adapted to be advanced against the action of springs 47 extending between the fingers and base 39, by the high points of circular cam plate 48.

The high points of cam plate 48 are reversed as to those of cam plate 44, so that when cam plate 44 acts to advance fingers 41, cam plate 48 will permit springs 47 to retract fingers 45, and vice versa. The cam plates are fastened together by means of screws and rotate together within the base 39.

Figure 11:
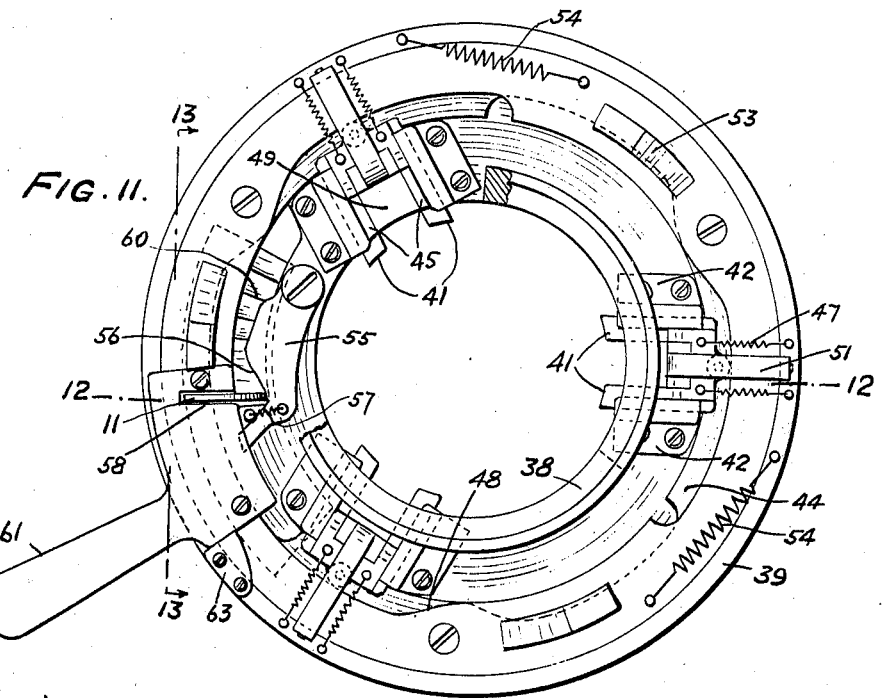
Fig. 11 is a plan view of the cup retaining and delivering device.
Figure 12:
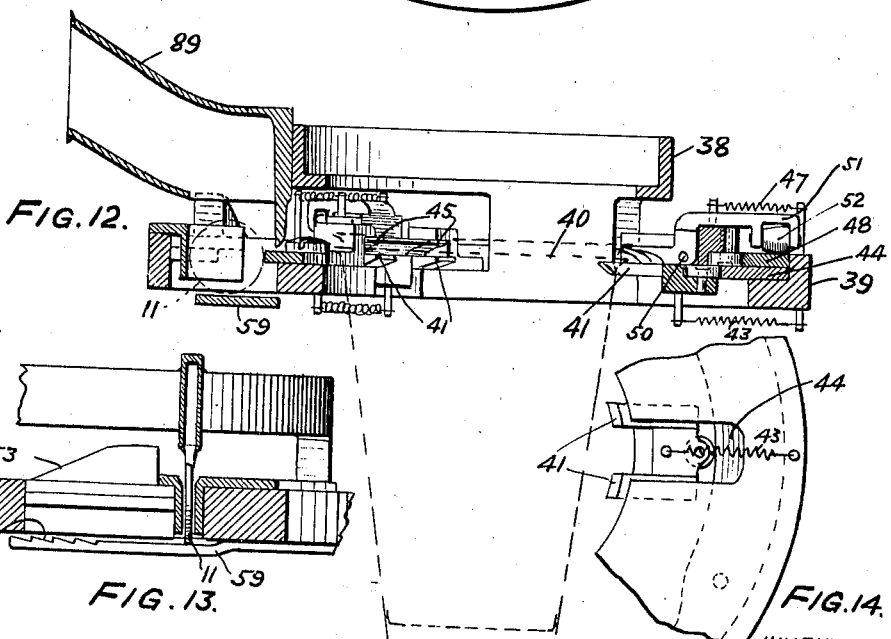
Fig. 12 is a sectional view along line 12—12 of Fig. 11.
Figure 13:
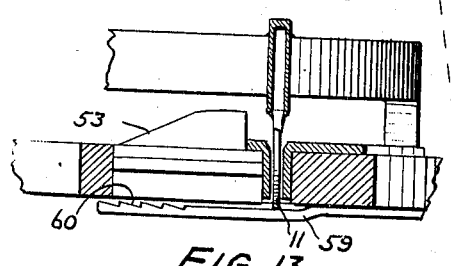
Fig. 13 is a sectional view along line 13—13 of Fig. 11.
Figure 14:
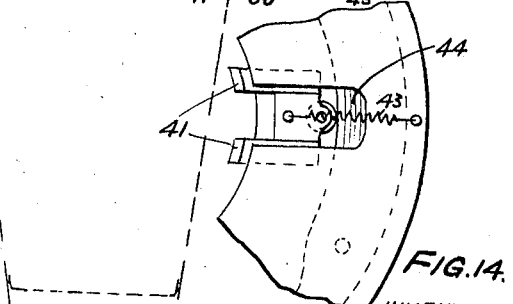
Fig. 14 is a detail bottom view of one of the cup retainers.

Levers 49 pivoted to the base at 50 are positioned between fingers 41 and 45 and are provided with extensions 51 to which are secured rollers 52. The cam plate 48 has formed on its upper surface, at intervals, cams 53 adapted, in the rotation of the cam plates, to underride the rollers 52 and tip the levers 49. Springs 54 are fastened to the cam plate 48 and to the base 39 to bring the cams back to their initial position, shown in Figure 11.

Pivoted to the base is a pawl 55 having on its side a cam 56, the point of the pawl being adapted to stop the cam plates when they are turned until the point contacts with the adjacent high point of cam plate 44, and before a cup can be released. A spring 57, extending between the base and the pawl, maintains the pawl in position to stop the cam plates. A radial slot 58 is cut in the cam plates adjacent the low point of cam 56 for the reception of a coin 11, which is supported by a plate 59 secured at one end to the underneath part of the frame and is provided adjacent its free end with ratchet teeth 60, the coin acting as a pawl, when the cup is released, to prevent the cams being retracted and again advanced to secure another cup with the same coin.

A handle 61 adapted to extend through slot 62 in the casing a is secured to the cam plate 48. A stop 63 is secured to the base adapted to contact with the inner end of the handle 61 and stop the cam plates in such a position that the coin slot 58 will be opposite the low point of pawl cam 56.

Positioned beneath the cup retaining and delivering mechanism is a cup delivering tube 64, which extends downwardly and through the casing a. Beneath the end of the delivering tube is cup holder 65, into which the delivered cup falls and from which it may be conveniently taken.

The coin-connected manually operated actuating mechanism for delivering the syrup and carbonated water comprises a rack bar 66 in engagement with pinion 20. An orificed block 67 surrounds the end of the rack bar and contains a coin slot at an angle therein just beyond the end of the enclosed bar. This block is adapted to be slid along the top of a coin chute 68 by a hand lever 72 pivoted to a suitable support and having an arm connected with the block by slot and pin connection 69$^a$.

Ordinarily, block 67 slides freely on the rack bar without moving it. When a coin is entered into its coin slot, however, the coin, being larger in diameter than the rack bar, forms a stop and in the movement of the block the bar is also moved, turning pinion 10 and operating the dispensing valve.

Chute 68 has an elongated opening 69 in its top face, underlying block 67 in its movement by the hand lever. This opening 69 is of a width to permit a coin or token of the relatively smaller diameter used in connection with the first dispensing mechanism, to fall directly through the coin slot in block 67 and through said opening 69 into chute 68; hence the relatively smaller coin or token cannot render the second dispensing mechanism operable through depression of lever 72. Said opening 69 is, however, through the major portion of its length, sufficiently narrow to afford a support for a coin or token of the relatively larger diameter employed for coupling and rendering operable the second dispensing mechanism, when such coin is held in the coin slot of block 67, and until said block is moved through depression of lever 72 to complete the function of the second dispensing mechanism. At or near the end of the inward movement of block 67, the coin or token, held in the coin slot of said block, reaches the widened portion 70 of opening 69 (see Fig. 7), and falls from block 67 into chute 68.

After the block has been made to travel as described, it returns to its initial position when the hand lever is released. Rack bar 66 is also returned to its initial position by providing a slot 93 in the bar adapted to act with a pin 94 in the block to allow free movement of the block when moved without any coin being entered.

An arm 74 extends from the lever to which arm one end of a spring 75 is fastened, the other end being fastened to the frame, to return and maintain the lever in its initial position as shown in Figure 5.

A ratchet 76 is formed on the lever adjacent the pivot having at one end a stop 77 and at the other end a pawl trip 78. A pawl 79 is pivoted to a suitable support in position to act on the ratchet 76 as the handle descends, until the trip acts to throw it out of engagement, when the handle reaches its lower limit. A detent pin 80, held in place by a spring 81, engages the short arm of the pawl and holds it in engagement with the ratchet until the pawl is tripped. The detent then holds the pawl out of its ratchet engaging position until the handle is raised and the stop 77 throws the pawl back into engagement with the ratchet.

Pivoted to the block engaging arm of lever 72 is a forked rod 83 engaging the shaft 10 with its forked end and having a shoulder 84 formed on its side to act as a stop for shaft 10 through the medium of arm 85 carried by cam 14 and positioned to contact with the arm when the rod 83 is fully advanced by the lever reaching its lower position. A dash pot 86 is positioned adjacent the lever 72 and connected with the block engaging arm to regulate the speed at which the lever may be moved.

A coin slot 88 in the casing a communicates with a coin duct 89, which leads the coin to slot 58 in cam plates 44 and 48.

Beneath the end of plate 59 is a coin duct 90 adapted to receive a coin released from the cup retaining mechanism and extends downwardly to a point just above the coin slot in block 67. A leaf spring 91 having a flange 92 at one end is fastened to the coin receptacle 68 and extends upwardly in such a position that when the block is not in position to receive a coin the flange will be under the end of the coin duct and will prevent a coin from coming out. When the block is returned to the coin receiving position the spring is pushed out of the way and the coin may drop into the coin slot.

To prepare the machine for operation, the valve $g$ is opened connecting the carbonated water supply with the horizontal tanks $c$, and plunger $i$ is adjusted in cylinder $h$ so that the cylinder will contain the desired quantity of carbonated water.

The cams 13 and 14 are set in the relation to each other shown in Figure 8, the cam 13 being in position to raise valve $x$, which in this position is seated on the face $w$, closing off the delivering tube, when the high point of cam 14 is about to leave the block 15.

The stroke of plunger 29 is adjusted, through adjustment of lever 32 on plate 34, to pump the required quantity of syrup.

In operation, if only a cup be desired, a coin or token of relatively smaller size is inserted in the coin slot 88 and passes along duct 89, dropping into slot 58, in the cup mechanism, and bearing against the low point of cam surface 56 on pawl 55. Handle 61 is then moved to the left, turning the cam plates 44 and 48 in a clockwise direction and at the same time moving the coin along cam surface 56 and base plate 59, causing it to force the pawl away from its normal position, preventing its engagement with the adjacent high point by cam plate 44, and causing the coin to engage in the ratchet teeth 60.

As the movement is continued the high points of cam plate 44 release the fingers 41 and permit springs 43 to retract them and release the bottom cup. Simultaneously the high points of cam plate 48 engage and advance fingers 45, which engages the flange of the cup next to the bottom, then cams 53 underride rollers 52, causing levers 49 to tip down and break out the cup, which falls into delivering tube and passes through the casing, landing in cup holder 65 as shown in Fig. 1. The coin has now reached the free end of base plate 59 and having no support drops out of slot 58 and falls into coin duct 90. When the cup is received, the handle 61 is released and springs 54 turn the cam plates in an anti-clockwise relation until handle 61 contacts with stop 63.

It will be noted that before the cup releasing mechanism starts to operate the coin engages the ratchet 60 and anti-clockwise movement of the cam plates is impossible until their clockwise movement has been completed and the coin has been permitted to drop out of the slot 58. Thus, it is impossible to obtain more than one cup with a single coin.

If both a cup and a beverage charge therefor be desired, a coin of relatively larger size is passed through the coin slot 88, handle or lever 61 is moved its full distance to force back the pawl 55 and deliver a cup as before, and the cup is lifted out of the holder 65 and placed in the holder 35 beneath the syrup and carbonated water nozzle. The coin, whether larger or smaller, after release of the cup passes down the coin duct 90 and into the coin slot in block 67, where, if of the larger size, it couples together the normally disconnected rack-bar 66 and block 67.

The lever 72 is next pulled downwards and rack bar 66, so coupled to block 67 by a coin of the larger size, rotates shaft 10, through pinion 20, pawl 21 and ratchet 22. As shaft 10 turns, lever 32 is actuated and causes plunger 29 to force syrup from well 27, up pipe 31, and into the cup and causes the plunger to again rise, permitting the well to refill. The rotation of shaft 10 causes cams 13 and 14 to turn. The high point of cam 13 moves away from roller 6, permitting valve $x$ to assume its lower position on seat $w$ under the influence of spring 7, opening communication between the cylinder $h$, which acts as a measuring cup, and the tanks $c$ through passage $y$ in the valve casing and pipe $n$, causing the measuring cup to fill with carbonated water.

Cam 14 turns on roller 16, forcing block 15 down and tensioning spring 17.

The rack advances turning the shaft 10 and the cams as above described until the cams assume the position shown in Fig. 8, with cam 13 about to raise roller 6 on the valve tappet and the roller 16 about to leave the high point of cam 14. In the movement of the hand lever, the forked rod 83 is advanced so that a slight continued movement of shaft 10 will cause arm 85 to contact with shoulder 84 and stop further movement.

A slight further movement of the rack causes block 15, under the influence of the tension set up in spring 17, to kick cam 14 around, as roller 16 goes off the high point of the cam, causing cam 13 to raise valve $x$, seating it on seat $v$ and causing pilot valve $z$ to close off passage $y$, at the same time opening communication between the cylinder $h$ and nozzle $t$, allowing the carbonated water in the cylinder to discharge into the cup and mix with the syrup. When roller 6 is on the high point of cam 13, arm 85 contacts with shoulder 84 and motion stops.

The coin drops through slot 70 into chute 68 leading to any convenient receptacle.

During the descent of lever 72 the pawl 79 engages ratchet 76, preventing the lever from being raised until it reaches the bottom of its stroke, when the pawl is tripped out of action by means of the tripper 78.

The lever 72 is returned to its initial position by means of spring 75 and the pawl put in action by stop 77, which engages it, as the handle reaches its initial position. It will be noted that when the lever is moved down it must be moved all the way down and the coin dropped out before it can be again raised, thus preventing any more than one portion of syrup and water being obtained with one coin. It will also be seen that in the absence of a coin in the slot 58, pawl 55 will preclude a movement of the actuating handle 61 a distance sufficient to effect release or delivery of a cup, but that the coin or token, whether of the larger or the smaller size, placed in slot 58, serves to move back said pawl 55 and permit full actuating movement of handle or lever 61. If the coin introduced into the slot 58 be of the smaller size, it will fall directly through the coin slot in block 67 and hence cannot couple said block to the rack-bar 66, and depression of lever 72 will consequently have no effect upon the liquid dispensing mechanism.

The muffler $q$ and arrangement of the nozzle $t$ in pipe $s$ prevents the water from splashing and spitting out of the nozzle $t$.

When it becomes necessary to wash out the machine, this may be done by attaching a hose to valve $o$, opening the valve and turning on a supply of water.

I do not herein claim the detals of the syrup pump, as shown in Fig. 10, or the carbonated water supply and measuring device and valve therefor, as shown in Fig. 3, with its controlling cam, shaft and lever, as these form the subject-matter of a separate divisional application filed December 31, 1919, Serial No. 348,669.

While the apparatus described in the foregoing specification is primarily designed to dispense either a cup or a cup and a carbonated-liquid and syrup charge therefor, it is obvious that other liquids such as coffee and cream, or in fact any suitable liquid commodities may be dispensed by this machine.

In compliance with official requirement, the claims pertaining to the cup-dispensing mechanism per se have been carried into a divisional application filed February 20, 1922, Serial No. 537,797.

Having now fully described my invention, what I claim and desire to protect by Letters Patent is:

1. An apparatus for dispensing successively a cup and a liquid charge therefor, comprising two distinct dispensing mechanisms, one for cups and the other for liquid charges; two manually operable actuating devices, one for each dispensing mechanism, that for the second including two normally disconnected members; a coin slot formed in a movable member of the first actuating device; a duct positioned to receive such coin from said coin slot and to deliver it between the disconnected members of the second actuating device; and a support for the coin so delivered and positioned, having an elongated opening of a width sufficient to permit a coin of relatively smaller diameter to fall directly through, but not sufficient to permit escape of a coin of relatively larger diameter until the second actuating device has carried the coin over and beyond such support.

2. An apparatus for dispensing successively a cup and a liquid charge therefor, comprising two distinct dispensing mechanisms, one for cups and the other for liquid charges; two manually operable actuating devices, one for each dispensing mechanism, that for the second including two normally disconnected members; a coin slot formed in a movable member of the first actuating device; a pawl serving to prevent effective movement of the first actuating device until forced out of arresting position by a coin carried in said slot; a duct positioned to receive such coin from said coin slot and to deliver it between the disconnected members of the second actuating device; and a support for the coin so delivered and positioned, having an elongated opening of a width sufficient to permit a coin of relatively smaller diameter to fall directly through, but not sufficient to permit escape of a coin of relatively larger diameter until the second actuating device has carried the coin over and beyond such support.

3. An apparatus for dispensing successively a cup and a liquid charge therefor, comprising two distinct dispensing mechanism, one for cups and the other for liquid charges; two manually operable actuating devices, one for each dispensing mechanism, that for the second including two normally disconnected members; a coin slot formed in a movable member of the first actuating device; a serrated surface over which a coin in the coin slot will move in a forward direction and with which it will engage and prevent backward movement of the actuating device; a duct positioned to receive such coin from said coin slot and to deliver it between the disconnected members of the second actuating device; and a support for the coin so delivered and positioned, having an elongated opening of a width sufficient to permit a coin of relatively smaller diameter to fall directly through, but not sufficient to permit escape of a coin of relatively larger diameter until the second actuating device has carried the coin over and beyond such support.

4. A dispensing apparatus comprising a cup container for a stack of cups, hand actuated devices for delivering a cup each time the mechanism is actuated, coin controlled means for permitting said mechanism to be actuated, said mechanism being arranged to be actuated by coins of different denominations, fluid measuring and delivery mechanism, a second hand actuated device for actuating the fluid measuring and delivery mechanism, said second hand actuated mechanism being independent of the first named hand actuated mechanism, coin controlled means for permitting said second hand controlled mechanism to be actuated, means for directing coins to the first hand actuated mechanism, means for directing the coins from the first hand actuated mechanism to the second hand actuated mechanism after a cup has been delivered, and means for throwing coins of one denomination in one direction and delivering coins of another denomination to the second hand actuated mechanism to permit the fluid measuring and delivering mechanism to be actuated.

In testimony of which invention, I have hereunto set my hand, at Philadelphia, Penna., on this 21st day of July, 1919.

JOHN FRICK.